United States Patent
Rick et al.

[15] 3,678,085
[45] July 18, 1972

[54] PROCESS FOR MAKING GROUP VIII METAL CYANIDES AND GROUP VIII METAL CYANIDE COMPLEXES

[72] Inventors: Edward A. Rick, Charleston, W. Va.; James E. McKeon, Thornwood, N.Y.; Peter Fitton; Benny J. Argento, both of South Charleston, W. Va.

[73] Assignee: Union Carbide Corporation, New York, N.Y.

[22] Filed: Aug. 8, 1969

[21] Appl. No.: 848,684

[52] U.S. Cl. ..............................260/429 R, 23/79, 23/359, 23/367, 252/431 P, 252/431 N, 260/429 CY, 260/439 R, 260/439 CY, 260/666 P, 260/677 H, 260/683.9
[51] Int. Cl. ...................C07f 15/00, C07f 15/04, C01c 3/08
[58] Field of Search ...............23/79, 359, 367; 260/429, 439

[56] References Cited

UNITED STATES PATENTS 3,538,142  11/1970  Drinkard et al.....................260/465.9

OTHER PUBLICATIONS

Candlin et al. Reactions of Transition Metal Complexes; Elsevier Publishing Co., New York, N.Y., 1968, p. 338, 412, 413
Mueller, Inorganic Chemistry, John Wiley and Sons, N.Y., N.Y., 1952 p. 463– 469
Wilkinson, Platinum Metal Reviews; 12 (1968) p. 50– 53
Benson, et al. Chem. e. L' Ind. (Milan) 1968 (50) p. 1227–1229
Baddley et al. Inorg. Chem. 5 (1966) p. 33– 35
Collman et al. Advances in Organometallic Chemistry vol. 7 (1968), Academic Press, N.Y., N.Y., p. 79– 81
Guttenberger, Angew. Chem. 79 (1967) p. 1071– 1072

*Primary Examiner*—Tobias E. Levow
*Assistant Examiner*—A. P. Demers
*Attorney*—Paul A. Rose and Louis C. Smith, Jr.

[57] ABSTRACT

A process for the manufacture of Group VIII metal cyanides or metal cyanide complexes wherein cyanogen is reacted with a Group VIII metal or metal complex.

7 Claims, No Drawings

PROCESS FOR MAKING GROUP VIII METAL CYANIDES AND GROUP VIII METAL CYANIDE COMPLEXES

This invention relates to a process for making various Group VIII metal cyanides and metal cyanide complexes.

In one aspect, the invention relates to the production of Group VIII metal cyanides and metal cyanide complexes by splitting the carbon-carbon bond of cyanogen during reaction of cyanogen with various Group VIII metals or metal complexes more fully described herein.

In another aspect, the invention relates to a liquid phase process for making various Group VIII metal cyanide complexes, wherein the process is characterized by its ease of operation.

It has now been found that Group VIII metal cyanides can be produced by reacting cyanogen with a zero valent Group VIII metal selected from the group of iron, ruthenium, osmium, nickel, palladium, and platinum and that Group VIII metal cyanide complexes can be produced by reacting cyanogen with a Group VIII metal complex wherein the metal is selected from the group consisting of iron(O), ruthenium(O), osmium(O), cobalt(I), rhodium(I), iridium(I), nickel(O), palladium(O), and platinum(O).

It is preferred to react a soluble co-ordination compound of a Group VIII metal in the suitable oxidation state as recited above with cyanogen in the instant process. The soluble coordination compound can contain neutral ligands and counterions described with particularity herein. It is further preferred to use a soluble low valent Group VIII metal complex having from 2 to 5 neutral ligands, and in the case of cobalt(I), rhodium(I) and iridium(I), to additionally possess a counter-ion.

For those low valent Group VIII metals possessing zero valent active forms, i.e., iron(O), ruthenium(O), osmium(O), nickel(O), palladium(O), and platinum(O), highly activated, finely divided metals can be used directly such as in freshly precipitated metal form or on supports, to react with cyanogen to form Group VIII metal cyanides, or to react with cyanogen in the presence of neutral ligands to form Group VIII metal cyanide complexes.

The Group VIII metal species used in this invention can be stabilized in suitable low valent complexes with neutral ligands containing olefinic unsaturation and/or at least one of the following trivalent donor atoms: N, P, As, and Sb, in which the donor atoms or olefinic unsaturation are capable of occupying positions in the co-ordination sphere of the metal. The exact structure of the ligands is not critical. The only requirement is that the ligands be capable of stabilizing the low valent metal species. The ligands can be monodentate or polydentate. Preferably the ligands are monodentate or bidentate. The monodentate ligands contain one atom or group which can occupy one position in the co-ordination sphere of the low valent metal. The bidentate ligands contain two atoms or groups, each of which can occupy a position in the co-ordination sphere of the metal. The number of ligands occupying positions in the co-ordination sphere will, of course, depend on whether monodentate or bidentate ligands are complexed with the metal. One bidentate ligand is obviously the equivalent of two monodentate ligands. The low valent metals are stabilized with the equivalent of 2 to about 5 monodentate ligands.

The low valent metal complexes with monodentate ligands are those of the type $M(L)_x$, M being any of Os(O), Ru(O), Fe(O), Pt(O), Pd(O), or Ni(O) or of the type $M(L)_xY$ when M is Ir(I), Rh(I) or Co(I), L being the ligand which is defined as below, Y being a counter ion and x having a value of from 2 to about 5.

The following are illustrative of the types of monodentate ligands (L) which can be employed in the invention:

$PR^1_2R^2$ where $R^1$ and $R^2$ can be the same or different and are hydrocarbyl groups such as alkyl, aryl, aralkyl, alkaryl, cycloalkyl, alkylcycloalkyl, cycloalkylalkyl and the like;

$PR^1_2(OR^2)$ where $R^1$ and $R^2$ can be the same or different and are hydrocarbyl groups such as alkyl, aryl, aralkyl, alkaryl, cycloalkyl, alkylcycloalkyl, cycloalkylalkyl and the like;

$PR^1(OR^2)_2$ where $R^1$ and $R^2$ can be the same or different and are hydrocarbyl groups such as alkyl, aryl, aralkyl, alkaryl, cycloalkyl, alkylcycloalkyl, cycloalkylalkyl and the like;

$P(OR^1)_3$ where $R^1$ is a hydrocarbyl group such as alkyl, aryl, aralkyl, alkaryl, cycloalkyl, alkylcycloalkyl, cycloalkylalkyl and the like;

$AsR^1_3$ where $R^1$ is a hydrocarbyl group such as alkyl, aryl, aralkyl, alkaryl, cycloalkyl, alkylcycloalkyl, cycloalkylalkyl, and the like;

$SbR^1_3$ where $R^1$ is a hydrocarbyl group such as alkyl, aryl, aralkyl, alkaryl, cycloalkyl, alkylcycloalkyl, cycloalkylalkyl and the like;

$R^1-N=C$ where $R^1$ is a hydrocarbyl group such as alkyl, aryl, aralkyl, alkaryl, cycloalkyl, alkylcycloalkyl, cycloalkylalkyl and the like;

$R^1-C=N$ where $R^1$ is a hydrocarbyl group such as alkyl, aryl, aralkyl, alkaryl, cycloalkyl, alkylcycloalkyl, cycloalkylalkyl and the like;

compounds containing olefinic unsaturation, preferably hydrocarbons, and preferably containing from 2 to about 8 carbon atoms, e.g., ethylene, cyclooctene, norbornene and the like;

heterocyclic bases, such as the heterocyclic amine, pyridine, and the like.

In the above formulas for L any $R^1$ or $R^2$ does not contain more than about 12 carbon atoms and preferably contains up to about 6 carbon atoms. The total number of carbon atoms in L generally does not exceed 36 and preferably does not exceed 18.

If M is any of Os(O), Ru(O), Ir(I), Fe(O), Rh(I), or Co(I), L can be, in addition to those ligands previously recited, carbon monoxide.

Illustrative of the alkyl groups are methyl, ethyl, propyl, butyl, pentyl, hexyl, decyl, and the like. Illustrative of the aryl groups are phenyl and naphthyl. Illustrative of the alkaryl groups are benzyl and xylyl. Illustrative of the alkaryl groups are tolyl and methylnaphthyl. Illustrative of the cycloalkyl groups are cyclobutyl, cyclopentyl, cyclohexyl, cyclo-octyl and the like. Illustrative of the alkylcycloalkyl groups are the cycloalkyl groups which contain from 1 to about 3 of any one or a mixture of the above alkyl groups as substituents on the cycloalkyl ring. Illustrative of the cycloalkylalkyl groups are the alkyl groups listed above which contain 1 or 2 of the cycloalkyl groups listed above as substituents.

Illustrative of the monodentate ligands which can be complexed with the low valent Group VIII metals are the trihydrocarbylphosphines such as the trialkylphosphines, e.g., trimethylphosphine, triethylphosphine, tripropylphosphine, tributylphosphine, and the like; the triarylphosphines, e.g., triphenylphosphine and the like; the trialkarylphosphines, e.g., tritolylphosphine and the like; and the mixed phosphines containing both alkyl and aryl radicals, e.g., dimethylphenylphosphine, ethyldiphenylphosphine and the like; the trihydrocarbylphosphites such as the trialkylphosphites, e.g., trimethylphosphite, triethylphosphite, tri-n-butylphosphite, and the like; triarylphosphites, e.g., triphenylphosphite and the like; tri-alkarylphosphites, e.g., tritolylphosphite and the like; and the mixed phosphites containing both alkyl and aryl radicals, e.g., dimethylphenylphosphite, ethyldiphenylphosphite and the like; the hydrocarbyl dihydrocarbylphosphinites such as the alkyl dialkylphosphinites, e.g., methyl dimethylphosphinite, ethyl diethylphosphinite, propyl dipropylphosphinite, butyl dibutylphosphinite, and the like; the aryl diaryl phosphinites, e.g., phenyl diphenylphosphinite and the like; the alkaryl dialkarylphosphinites, e.g., tolyl ditolylphosphinite and the like; and the mixed phosphinites containing both aryl and alkyl radicals, e.g., ethyl diphenylphosphinite and the like; the dihydrocarbyl hydrocarbylphosphonites such as the dialkyl alkyl phosphonites, e.g., dimethyl methylphosphonite, diethyl ethylphosphonite, dipropyl propylphosphonite, dibutyl butylphosphonite and the like; the diaryl arylphosphonites, e.g., diphenyl phenylphosphonite and the like; dialkaryl alkaryl phosphonites, e.g., ditolyl tolylphosphonite and the like; and the mixed phosphonites containing both aryl and alkyl radicals, e.g., dimethyl phenylphosphonite, and the like; the trihydrocarbyl arsines such as the trialkylarsines, e.g., the trimethyl-, triethyl-, tripropyl- and tributyl arsines and the like; the triarylarsines, e.g., triphenylarsine and the like; the trialkarylarsines, e.g., tritolylarsine and the like; and the mixed arsines containing both alkyl and aryl radicals, e.g., dimethylphenylarsine, ethyldiphenylarsine and the like; the trihydrocarbylstibines such as the trialkylstibines, e.g., the trimethyl-, triethyl-, tripropyl-, tributylstibines and the like, the triarylstibines, e.g., triphenylstibine and the like, the trialkarylstibines, e.g., tritolylstibine and the like; and the mixed stibines containing both alkyl, and aryl radicals, e.g., dimethylphenylstibine, ethyldiphenylstibine and the like; the hydrocarbylnitriles, e.g., propionitrile, butyronitrile, valeronitrile, benzonitrile, and the like; the hydrocarbylisonitriles, e.g., propylisonitrile, butylisonitrile, benzylisonitrile and the like; and when the metal is Os(O), Ru(O), Fe(O), Ir(I), Rh(I) or Co(I), carbon monoxide.

In addition to the above recited neutral ligands, the Group VIII metal compounds can also contain conventional counterions, Y, such as halides, sulfates, carboxylates, alkoxides, and the like. Halides such as chloride and alkoxides such as propoxide are preferred. Counter-ions are noticeably present when coordination compounds of rhodium(I), iridium(I) and cobalt(I) are prepared.

The following general formula is illustrative of the bidentate ligands which may be complexed with the Group VIII metals used in the invention:

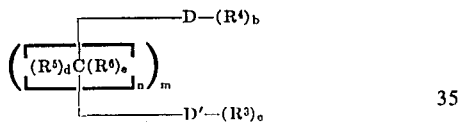

wherein D and D' are heteratoms selected from the group consisting of nitrogen, phosphorous, arsenic and antimony and may be the same or different heteroatoms;

is a bridge linking D and D'; $R^5$ and $R^6$ are hydrogen, hydrocarbyl groups or hydrocarbyloxy groups, or $R^5$ and $R^6$ together can form a monocyclic aliphatic or polycyclic ring system with the carbon atom to which they are attached, or $R^5$ and/or $R^6$ together with the carbon atom to which they are attached can form monocyclic or polycyclic aliphatic or aromatic ring systems with another bridge-forming carbon atom and its substituents; $d$ and $e$ are independently either zero or 1, and when the bridge carbon is part of a multiple bond, $d$ and/or $e$ are zero; $n$ is the number of carbon atoms in the bridge and has a value of from 1 to about 4; $m$ is the number of bridges and has a value of 1 or 2, and when $m$ is 2, the bridges need not be the same; $R^3$ and $R^4$ are either the same or different hydrocarbyl or hydrocarbyloxy groups or $R^3$ and/or $R^4$ together with one or both of D and D' and one or more bridge-forming carbon atoms can form a heteromonocyclic or polycyclic ring system, in which case if D or D' is nitrogen two $R^4$ or $R^3$ can represent a double bond to D or D' respectively; $b$ and $c$ are each equal to $3-m$.

D and D' are preferably nitrogen, arsenic, or phosphorous. Most preferred are nitrogen and phosphorus because compounds containing them are relatively readily available.

$R^1$, $R^2$, $R^3$, $R^4$, $R^5$, and $R^6$ may also contain other groups which are unreactive under the conditions of the process, such as hydroxy, cyano, and the like.

Illustrative of some of the bidentate ligands which may be complexed with the Group VIII metals useful in this invention are:

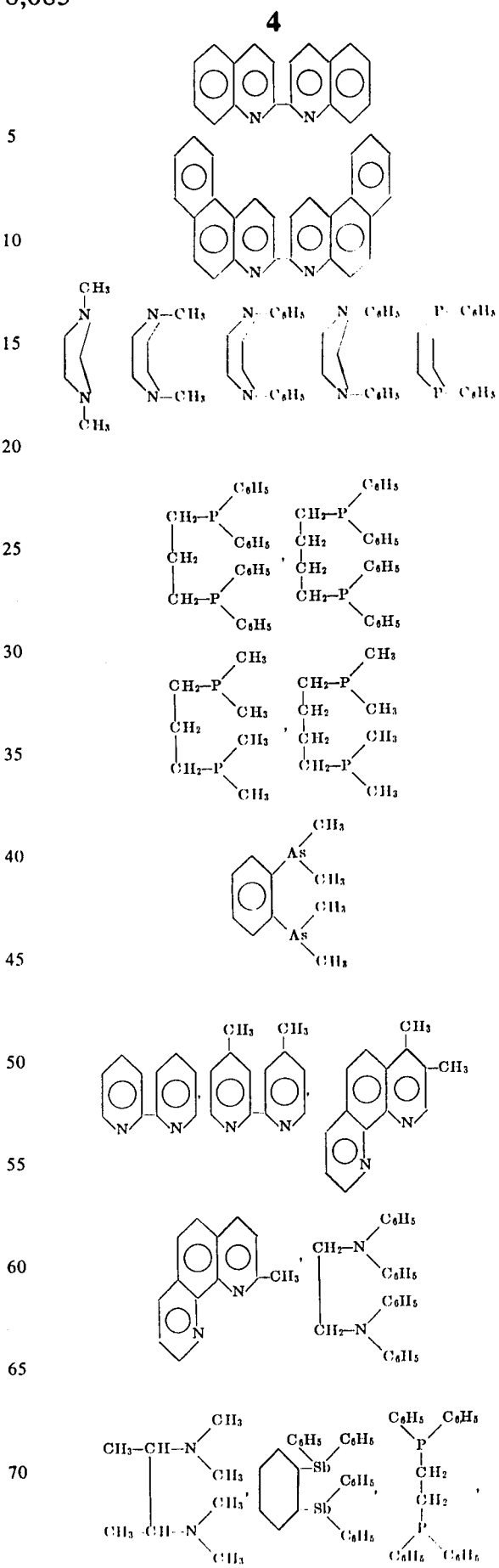

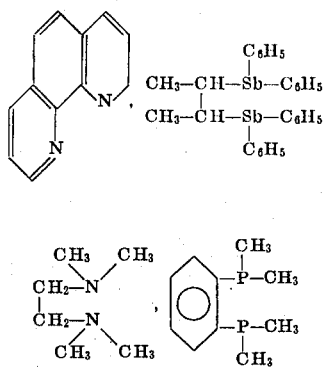

Other ligands which may be coordinated to the Group VIII metals are heterocyclic bases and mono- and diolefins which contain up to about 8 carbon atoms, e.g., 1,5-cyclooctadiene, norbornadiene, acrylonitrile, maleic anhydride and the like.

As stated above, the ligands may be mono- or polydentates, and where more than one ligand is attached to the metal, the ligands may be the same or different.

Representative soluble coordination compounds of various Group VIII metals are tetrakis(triphenylphosphine)palladium(O), tetrakis(triphenylphosphine)platinum(O), chlorocycloocta-1,5dieneiridium(I) dimer, trans-chlorocarbonylbis(triphenylphosphine)-iridium(I), chlorotris(triphenylphosphine)rhodium(I), chloronorbornadienerhodium(I) dimer, chlorocycloocta-1,5-dienerhodium(I) dimer, osmium pentacarbonyl, triosmium dodecarbonyl, tricarbonylbis(triphenylphosphine)ruthenium(O), tricarbonylbis(triphenylarsine)-ruthenium(O), iron pentacarbonyl, tricarbonylbis(triethylphosphine)-iron(O); $[Co(CO)_3(P-(C_6H_5)_3)_2]^+$ $[Co(CO)_4^-$ compounds of this type can be made in situ from the disproportionation of $Co_2(CO)_8$, the readily available form of low valent cobalt, in the presence of suitable ligands; tetrakis(diphenylmethylphosphine)palladium(O), bis(trinaphthylphosphine)palladium(O), tetrakis(phenyldiphenylphosphinite)palladium(O), tetrakis(diethyl phenylphosphonite)platinum(O), tetrakis(triphenylarsine)platinum(O), tetrakis(tritolylstibine)-platinum(O), bis(triphenylphosphine)(P,P,P,P'-tetraphenyl-1,2-ethylene diphosphine)palladium(O), bis(triphenylphosphine)-diphenylacetyleneplatinum(O), tetrakis(triphenylphosphite)nickel(O), bis(cycloocta-1,5-diene)nickel(O), bis(acrylonitrile)nickel(O), bis-(acrylonitrile)bis(triphenylphosphine)nickel(O), and the like.

When compounds of the subgroup, iron(O), ruthenium(O), and osmium(O) are reacted with cyanogen, the resulting compounds have oxidation states of iron(II), ruthenium(II) and osmium(II) which can be oxidized further under more rigorous conditions. Iron(O) compounds react readily with cyanogen but the reaction mixtures have not yet been completely characterized.

When compounds of the subgroup, cobalt(I), rhodium(I), and iridium(I) are reacted with cyanogen, the resulting compounds have oxidation states of cobalt(III), rhodium(III), and iridium(III) respectively. These compounds are not subject to further oxidation.

The nickel(O), palladium(O), and platinum(O) subgroup compounds react with cyanogen to give products with oxidation states of nickel(II), palladium(II), and platinum(II) respectively and are four co-ordinate square planar in structure. While it might be expected that the metals of this subgroup would add another cyanogen to advance to an oxidation state of IV, analysis has indicated that this does not occur.

The products formed from the reaction exhibit a variety of catalytic properties. For example, the platinum and palladium cyanide complexes are useful as hydrogenation catalysts for polyolefins and natural unsaturated fats and oils. The cobalt cyanide complexes find utility as Oxo catalysts, while the nickel cyanide complexes made excellent bicycloheptadiene dimerization catalysts.

The process is carried out by reacting cyanogen with the Group VIII metal or metal complex at a temperature of from below room temperature to about 200° C. A range of from room temperature to about 150° C. is preferred. The cyanogen can be used in stoichiometric, less than stoichiometric or greater than stoichiometric amounts.

The reaction time can range from instantaneously to several hours or longer depending upon the reaction temperature and the Group VIII metal or metal co-ordination compound used.

Pressure does not appear to be critical and the reaction can be conducted at autogenous or higher pressure, with an inert atmosphere of argon or nitrogen preferred to minimize undesirable secondary oxidations.

If desired, mutual solvents for the reactants which are themselves inert in the reaction can be used. Exemplary solvents are aromatic hydrocarbons such as benzene and toluene, ethers such as diethyl ether and 1,2-diethoxy ethane, hydrocarbons such as pentane, hexane, and heptane; aliphatic amides such as dimethyl formamide, dimethylacetamide, diethylformamide, and diethyl-acetamide; tetramethyl urea; esters such as ethyl acetate, and ketones such as methyl ethyl ketone and acetone.

The reaction can be conducted in a batchwise, semicontinuous, or continuous manner. The continuous reaction can be counter-current, co-current or cross-current in nature.

Conventional reaction equipment can be used such as glass vessels, glass-lined steel containers, and stainless steel kettles. Any equipment can be used which is not unduly effected by the oxidation reaction.

The following examples are illustrative.

EXAMPLE I

A solution of 1.4 grams of cyanogen in 5 milliliters of benzene was added to a solution of 2.2 grams of tetrakis(triphenyl-phosphine)palladium(O) in 25 milliliters of degassed benzene. The mixture was capped under nitrogen in a thick-wall pressure tube and heated to 100° C. At this temperature, the mixture rapidly changed from yellow to colorless and colorless granular crystals started to precipitate. Heating continued for three hours, after which the solution was cooled and the benzene removed on a rotary evaporator. The resulting solid was triturated with ether, filtered and dried. Recrystallization from chloroform-hexane yielded 1.1 grams dicyanobis(triphenylphosphine)palladium(II) with a melting point greater than 300° C.

EXAMPLE II

A solution of 1.4 grams of cyanogen in 5 milliliters of benzene was added to a solution of 1.1 grams of tetrakis(triphenyl) phosphine)platinum(O) in 25 milliliters of degassed benzene and the mixture was heated at 100° C. in a sealed tube under nitrogen for five hours. The solution was cooled, benzene was removed on a rotary evaporator and the resulting solid was triturated with ether to give a colorless crystalline product. On recrystallization from chloroformhexane, 0.3 gram of dicyanobis(triphenylphosphine)platinum(II) was recovered.

EXAMPLE III

To a thick-wall pressure test tube was charged $1.67 \times 10^{-3}$ moles of tetrakis(propyl diphenylphosphinite)nickel(O) and 30 milliliters of benzene. Cyanogen was passed through the orange, homogeneous solution until the color changed to deep red (approximately 45 seconds). After 15 minutes, cyanogen was passed through the solution for an additional 45 seconds and the solution was allowed to stand for 30 minutes. The reaction solution was then filtered by vacuum and the filtrate was added dropwise to 200 milliliters of n-hexane. A yellow precipitate formed immediately and was recovered by vacuum filtration.

After washing with n-hexane and drying at 80° C. and 0.5 millimeters of mercury, the solids weighed 0.38 grams (61.2 per cent yield as dicyanobis(propyl diphenylphosphinite)nickel(II). The infrared spectrum of the material was identical to that of dicyanobis(propyl diphenylphosphinite)nickel(II) and it melted at 131° to 136° C. This was compared to a melting point of 136° – 137° C. for dicyanobis(propyl diphenylphosphinite)nickel(II) prepared via a different route and recrystallized from methyl ethyl ketone. Calculated for dicyanobis(propyl diphenylphosphinite)nickel(II): C, 64.18 percent; H, 5.71 percent; N, 4.43 percent. Found: C, 63.64 percent; H, 5.73 percent, N, 4.43 percent.

EXAMPLE IV

To a thick-wall glass tube was charged with $2.55 \times 10^{-4}$ mole of chlorocarbonylbis(triphenylphosphine)iridium(I) and 30 milliliters of benzene. The mixture was heated slightly to effect solution. The tube was placed in an ice-water bath and cyanogen was passed through the solution for approximately two minutes. The tube was then cooled to dry ice-acetone temperature, under an argon atmosphere, and sealed. At room temperature, there were some white solids visible. The gain in weight due to cyanogen was 3.0 grams ($5.7 \times 10^{-2}$ moles). The tube was placed in a 50° C. oil bath for 72 hours. It was then cooled to dry ice-acetone temperature, the seal was broken, and the unreacted cyanogen was allowed to evaporate. The mixture was filtered and the collected white solids were washed with benzene and dried at 80° C and 0.45 milliliters of mercury for two hours. The material weighed 0.15 gram. Analysis - The infrared spectrum of this material contained strong absorption at 2050 cm$^{-1}$ attributed to CN, in a metal-nitrile complex, and did not contain the strong absorption at 1980 cm$^{-1}$ attributed to carbonyl. There was also weak absorption at 2075 cm$^{-1}$. The remainder of the spectrum was unchanged. The melting point of the material was greater than 300° C. Calculated for $[Ir(CN)(Cl)_2(_3P)_2]_x$.

|    | Calc.(%) | Found (%) |
|----|----------|-----------|
| C  | 54.60    | 54.08     |
| H  | 3.72     | 3.19      |
| N  | 1.72     | 1.86      |
| Cl | 8.76     | 8.14      |

EXAMPLE V

To a thick-wall glass tube was charged $2.55 \times 10^{-4}$ mole of chlorocarbonylbis(triphenylphosphine)rhodium(I) and 30 milliliters of benzene. The mixture was heated slightly to effect solution. The tube was placed in an ice-water bath and cyanogen was passed through the solution for approximately two minutes. The tube was then cooled to dry ice-acetone temperature, under an argon atmosphere, and sealed. The tube was placed in a 50° C. oil bath for 72 hours. It was then cooled to dry ice-acetone temperature, the seal was broken and unreacted cyanogen was allowed to evaporate.

The mixture was filtered and the light yellow solids were washed with benzene, and dried at 80° C. and 0.45 millimeters of mercury for two hours. The material weighed 0.08 grams. The infrared spectrum of the collected material showed strong absorption in the region attributed to CN, in a metal nitrile complex, and did not show the absorption in the region attributed to carbonyl. Elemental analysis confirmed the presence of nitrogen in the compound.

EXAMPLE VI

In an analogous manner as in Example IV, cyanogen is passed through a solution of $2.55 \times 10^{-4}$ mole of tricarbonylbis(triphenylphosphine)osmium(O) and 30 milliliters of benzene to yield an osmium carbonyl triphenylphosphine cyanide.

What is claimed is:

1. A process for the production of a Group VIII metal (II) complex having four coordination sites wherein two of said sites are each occupied by a cyano radical and two of said sites are each occupied by an atom contained in a neutral ligand, said neutral ligand being selected from the group consisting of monodentate or polydentate ligands containing olefinic unsaturation and having 2 to 8 carbon atoms per unit of olefinic unsaturation or containing at least one trivalent donor atom selected from the group consisting of nitrogen, phosphorus, arsenic, and antimony and having up to 18 carbon atoms per donor atom comprising contacting with cyanogen a Group VIII metal (O) complex selected from the group consisting of metal complexes of nickel (O), palladium (O), and platinum (O) having four coordination sites and containing a sufficient number of the ligands heretofore define to satisfy the four coordination sites.

2. The process according to claim 1 wherein said metal(O) complex is a complex of nickel(O).

3. The process according to claim 1 wherein said metal(O) complex is a complex of palladium(O).

4. The process according to claim 1 wherein said metal(O) complex is a complex of platinum(O).

5. The process according to claim 1 wherein said metal(O) complex is tetrakis(triphenylphosphine)palladium(O).

6. The process according to claim 1 wherein said metal(O) complex is tetrakis(triphenylphosphine)platinum(O).

7. The process according to claim 1 wherein said metal(O) complex is tetrakis(propyl diphenylphosphinite)nickel(O).

* * * * *